United States Patent
Carter, Jr.

[11] Patent Number: 5,128,602
[45] Date of Patent: Jul. 7, 1992

[54] PARALLEL SUPPLY FOR MULTIPLE LOADS FROM A SINGLE POWER SUPPLY

[75] Inventor: Philip S. Carter, Jr., Palo Alto, Calif.

[73] Assignee: Metcal, Inc., Menlo Park, Calif.

[21] Appl. No.: 691,854

[22] Filed: Apr. 26, 1991

[51] Int. Cl.$^5$ .................................................. G05F 1/12
[52] U.S. Cl. .................................... 323/267; 333/12; 333/112; 333/113; 307/33
[58] Field of Search ............. 323/267; 363/65; 333/1, 333/12, 35, 100, 109, 112, 113, 136, 137; 307/11, 31, 32, 33

[56] References Cited

U.S. PATENT DOCUMENTS

| | | | |
|---|---|---|---|
| 3,599,008 | 8/1971 | Goraki-Poplel | 307/200 |
| 4,242,741 | 12/1980 | Parrish | 333/12 |
| 4,256,945 | 3/1981 | Carter et al. | 219/10.75 |
| 4,626,767 | 12/1986 | Clappier et al. | 323/280 |
| 4,769,519 | 9/1988 | Hall | 219/10.41 |
| 4,795,886 | 1/1989 | Carter, Jr. | 219/505 |

OTHER PUBLICATIONS

Antenna Engineering Handbook, McGraw-Hill, First Edition, (1961), pp. 24-8 to 24-11.

*Primary Examiner*—Peter S. Wong
*Attorney, Agent, or Firm*—Howard L. Rose

[57] ABSTRACT

A single constant voltage power supply concurrently supplies a plurality of independent loads each with an independently selectable constant current load without interaction between the loads (currents) by employing a plurality of parallel connected circuits of electrical lengths equal to $(2n-1)90°$ each connected between the constant voltage source and a different one of said loads.

12 Claims, 2 Drawing Sheets

5,128,602

PARALLEL SUPPLY FOR MULTIPLE LOADS FROM A SINGLE POWER SUPPLY

FIELD OF THE INVENTION

The present invention relates to power supplies and more particularly to a constant current or constant voltage power supply capable of concurrently supplying power to multiple loads in parallel without interaction between the loads or the power supplied to each of them.

BACKGROUND OF THE INVENTION

In U.S. Pat. No. 4,626,767 to Clappier and assigned to the same assignee as the present invention there is disclosed an alternating current, constant voltage power supply feeding a load through a quarter wavelength circuit to convert the constant voltage to a constant current. The frequency of operation of the supply is radio frequency and the frequency disclosed in the aforesaid patent is 13.56 MHz.

The aforesaid power supply is employed by the assignee Metcal, Inc. to power a line of temperature self regulating heaters such as soldering irons, heater straps and related heaters which rely on the change of magnetic permeability of certain materials at their effective Curie temperatures to control temperature of the heaters. Such materials may be ferromagnetic materials; iron-nickel alloys for instance; ferrites and other high magnetic permeability materials that lose their high magnetic permeability at specific temperatures. The term "effective Curie temperature" refers to the fact that the temperature at which a material becomes nonmagnetic for purposes of temperature control may be as little as 1° C. or as much as 100° C. less than absolute Curie temperature.

The underlying principle of these temperature self regulating heaters lies in the fact that due to skin effect produced by alternating currents flowing through or inductively induced in a high permeability conductor particularly at high frequencies, the current is confined to a narrow region of the high permeability (high mu) conductor thus causing it to exhibit a high resistance to current flow. When the material is heated by such current flow to its effective Curie temperature, the skin effect is materially reduced, the current spreads more uniformly throughout the body of the conductor and the resistance to flow is materially reduced. See for instance U.S. Pat. No. 4,256,945.

The power generated in a system as discussed above is defined by $P=I^2R$. If I is held constant then $P=KR$. If now the resistance is materially reduced in the system as effective Curie temperature is approached, the system cannot generate the heat necessary to maintain effective Curie temperature, the conductor cools, the conductor again becomes highly magnetically permeable and the cycle repeats.

As indicated above the current must remain constant to achieve the best possible temperature regulation although some variation in current is permissible if some leeway is allowed in temperature control within a given system.

The power supply disclosed in U.S. Pat. No. 4,626,767 provides quite rigid current control and is expensive, presently in the $350 to $400 range. Attempts to lessen the cost by other approaches such as disclosed in Carter U.S. Pat. No. 4,795,886 and Hall U.S. Pat. No. 4,769,519 have not as yet been developed to the point of commercial use.

OBJECTS OF THE PRESENT INVENTION

It is an object of the present invention to provide a power supply that can supply power to a large number of loads simultaneously in parallel without the power demands of one or more loads affecting the power available to any other load.

It is another object of the present invention to provide a constant voltage power supply supplying a plurality of constant-current-demand loads through a plurality of quarter wavelength or odd multiples of quarter wavelength circuits $((2n-1)\ 90°)$ whereby to convert constant voltage into constant current while simultaneously isolating the loads from one another whereby each load receives the amperage necessary to satisfy its load demands.

BRIEF DESCRIPTION OF THE PRESENT INVENTION

The present invention provides a high frequency constant voltage power supply capable of feeding a plurality of loads in parallel with constant currents. The supply provides a constant voltage at its output port which is connected through special converter circuits, to a plurality of load circuits.

One possible implementation of the invention is shown in the accompanying drawing FIG. 1. Here the power output of the generator is divided among the three electrical loads $Z_{L2}$, $Z_{L3}$ and $Z_{L4}$. Each of these electrical loads is connected to the generator by means of a transmission line having an electrical length of an odd number of quarter wavelengths. These transmission lines are connected together in parallel at the output port of the A-C generator. In the case illustrated in FIG. 1, coaxial cable is indicated although other types of transmission lines may be used including hollow wave guides.

In addition to transmission lines and waveguides there are other circuits which will perform the same function These circuits and the necessary circuit conditions which must be met are described more fully in the detailed description of the invention set forth below.

The above power distributing circuit or its electrical equivalent maintains constant both the magnitude and phase of the current in each of the load circuits. Furthermore, the magnitude of the load current in each load circuit of FIG. 1 can be selected, i.e., set at a desired value by specifying the characteristic impedance of the transmission line section to which it is connected.

This system for providing different power to multiple variable loads should be classified as a power distribution network rather than a power divider. Each load is provided with a constant current, the power delivered to each load varying with changes in the load resistance. Of course the total power delivered to the multiple loads must be within the power delivery capability of the generator at all times.

DETAILED DESCRIPTION OF THE INVENTION

Figure 1:
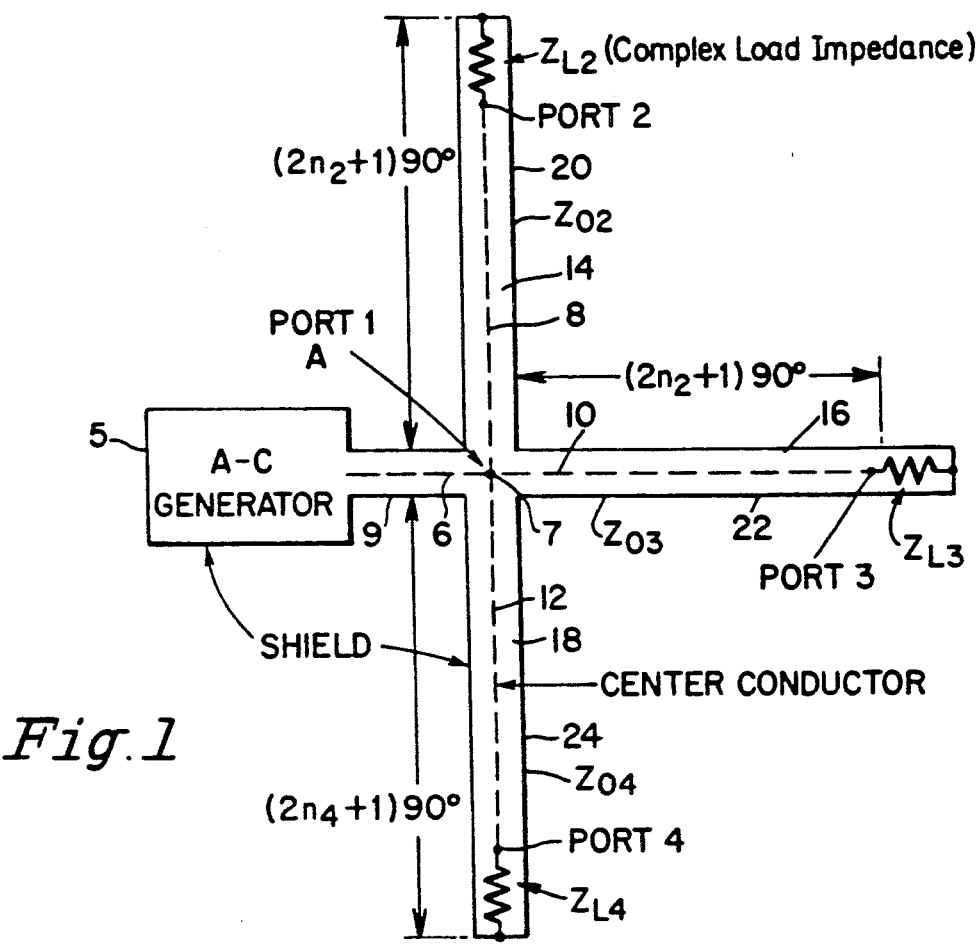
FIG. 1 is a schematic diagram of a shielded constant voltage to constant current (CVCC) multiple load system using coaxial transmission lines.

Referring now specifically to FIG. 1 of the accompanying drawings there is illustrated a shielded CVCC multiple load system employing coaxial transmission lines. The system employs a constant voltage generator 5 (which may be of the type illustrated in U.S. Pat. No. 4,626,767) supplying to its output port 1 a constant voltage. Feedback or other means is employed in the power supply to maintain a constant voltage at the common junction point 7. Center lead 6 of output port 1 is connected at a common junction 7 to center leads 8, 10 and 12 of three coaxial cables 14, 16 and 18, respectively. Outer shields 20, 22 and 24 of cables 14, 16 and 18, respectively, are also all connected together to return lead 9 of the generator. The cables 14, 16 and 18 provide output ports 2, 3 and 4 at their ends remote from port 1.

Figure 2:
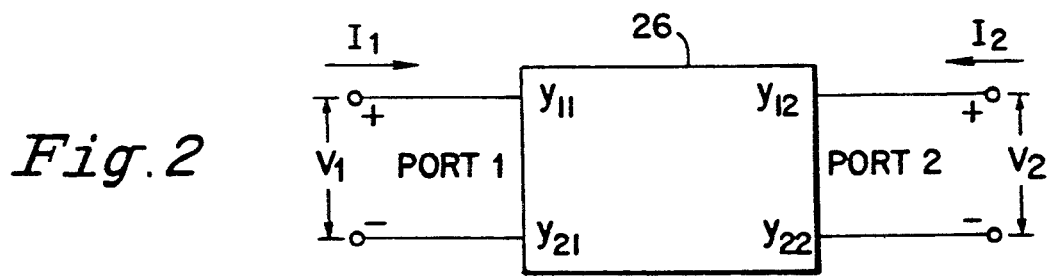
FIG. 2 is a short circuit representation of a two port network.
Figure 3:
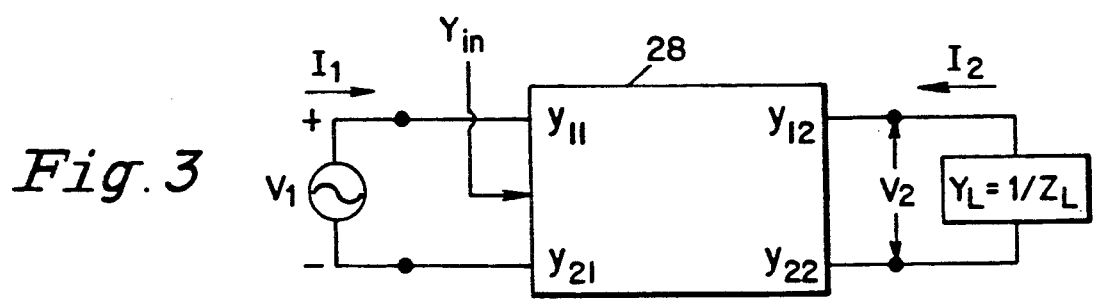
FIG. 3 is a representation of a terminated network with a constant voltage generator input.

Each of the cables 14, 16 and 18 are one-quarter of a wavelength long or an odd multiple thereof operating as a single circuit element. It should be noted that the power supply of U.S. Pat. No. 4,626,767 provides a $\frac{1}{8}\lambda$ circuit in the form of lumped constants so that only sufficient line must be added to provide another $\frac{1}{8}\lambda$ although an addition of $\frac{3}{8}\lambda$ is sometimes more practical. The cables may also be achieved by using the lumped constant circuit equivalents to the transmission lines throughout. Lumped element equivalent transmission lines designs have been described by F. E. Terman, "Radio Engineers Handbook", Section 3, Par. 17, pp. 193-195, McGraw-Hill Book Co., Inc., N.Y. (1943). Before undertaking a detailed analysis of the multiload system, a single CVCC circuit is analyzed relative to FIGS. 2 and 3 of the drawings. FIGS. 2 and 3 illustrate an equivalent circuit representation of a single transmission line element using its equivalent short circuit admittance parameters, $Y_{11}$, $Y_{12}$, $Y_{21}$ and $Y_{22}$. These parameters are described below in the discussion of the four port network of FIG. 1.

The following equations apply to FIGS. 2 and 3:

$$I_1 = Y_{11}V_1 + Y_{12}V_2 \quad \text{(a) and}$$

$$I_2 = Y_{21}V_1 + Y_{22}V_2 \quad \text{(b) (1)}$$

where boxes bearing numerals 26 and 28 indicate transmission lines or impedance networks or a combination thereof.

If $Y_{22}=0$ and $Y_{21}\neq 0$ then $I_2=Y_{21}V_1$ and the output current is independent of the output load. In a well designed low loss quarter wavelength cable, $Y_{22}$ approaches zero sufficiently closely that the desired result, substantially constant load current, is achieved when the input voltage is maintained constant. Thus, there is provided a constant voltage to constant current converter. Further, when the previous conditions are met, the input admittance $Y_{in}$ is given by:

$$Y_{in} = Y_{11} - \frac{Y_{12}Y_{21}}{Y_L} := Y_{11} - Y_{12}Y_{21}Z_L \quad (2)$$

where $Y_L$ is the load admittance

Finally it can be shown that $Y_{12}=Y_{21}=j/Z_0$ where $Z_0$ is the characteristic impedance of the cable, j is the conventional ninety degree phase multiplier, and $Y_{11}=Y_{22}=0$. Substituting these equalities in the above Equation 2 for $Y_{in}$, Equation 3 below results:

$$Y_{in} = \frac{1}{Z_{in}} = \frac{Z_L}{Z_0^2} \quad (3)$$

The output current $I_2$ can be selected in either of two ways according to Equation 3b by substituting $Y_{21}=j/Z_0$ and $Y_{22}=0$, resulting in the following Equation 4.

$$I_2 = jV_1/Z_0 \quad (4)$$

Thus $I_2$ can be selected by choosing appropriate values of $V_1$ and $Z_0$.

Returning now to the circuit of FIG. 1 and applying the analysis relative to FIGS. 2 and 3, both the lumped element and ordinary transmission line circuits may be employed in the same system with each providing $\frac{1}{8}$ of a wavelength for instance. The operating requirements for the four port system in FIG. 1 are:

$$Y_{22} = Y_{33} = Y_{44} = 0$$

$$Y_{23} = Y_{32} = 0$$

$$Y_{24} = Y_{42} = 0$$

$$Y_{34} = Y_{43} = 0 \quad (5)$$

and $V_1$ must be constant.

The subscripted Y's in Equation 5 are the equivalent short circuit admittances of the four port representation of the circuit in FIG. 1. The representation of a multiple port network by means of equivalent short circuit admittances, is commonly used in network analysis and is set forth in numerous network analysis textbooks, for instance the wall known text by N. B. Balabanian and T. Bickart, "Electrical Network Theory", Section 3.6, pp. 178-187, John Wiley and Sons, Inc., N.Y. (1969). The corresponding network equations are reproduced in Equation 6 below for the four port network in FIG. 1.

$$I_1 = Y_{11}V_1 + Y_{12}V_2 + Y_{13}V_3 + Y_{14}V_4 \quad (a)$$

$$I_2 = Y_{21}V_1 + Y_{22}V_2 + Y_{23}V_3 + Y_{24}V_4 \quad (b)$$

$$I_3 = Y_{31}V_1 + Y_{32}V_2 + Y_{33}V_3 + Y_{34}V_4 \quad (c)$$

$$I_4 = Y_{41}V_1 + Y_{42}V_2 + Y_{43}V_3 + Y_{44}V_4 \quad (d) (6)$$

The Y's in Equation 2 are called short-circuit admittance parameters, and are determined as follows. For example, $Y_{11}$ is equal to the input admittance at port 1 under the condition that all the remaining ports are short circuited, i.e.: $V_2=V_3=V_4=0$. Thus $$Y_{11} = \frac{I_1}{V_1}$$

with ports 2, 3 and 4 short circuited. The conventions for the direction of positive going currents $I_1$, $I_2$, $I_3$ and $I_4$ and the positive polarity of the voltages. $V_1$, $V_2$, $V_3$ and $V_4$ are the same for the four port case as for the two port case indicated in FIGS. 2 and 3.

It can be seen from Equation 6 that in order for the three load currents, $I_2$, $I_3$ and $I_4$ to depend only on $V_1$, the conditions stated in Equation 5 must be fulfilled, that is all of the equivalent short circuit admittances except those associated with Port 1 in FIG. 1 must be equal to zero. As previously indicated the network of FIGS. 2 and 3 where $Y_{22}=0$ and $Y_{21}\neq 0$ is one type that can fulfill the requirements of FIG. 1.

There are other types of networks that can serve this purpose, some of which combine lumped constant and transmission line elements. As an example of a combined lumped constant and transmission line network reference is made to FIG. 4 wherein:

$$\theta = -\tan - 1 \frac{2x}{Z_0} \text{ radians and}$$

$$K = Z_0 \tan \left| \frac{\theta}{2} \right| \text{ohms}$$

where $Z_0$ is the characteristic impedance of the transmission line and $\theta$ is its electrical length.

Figure 4:
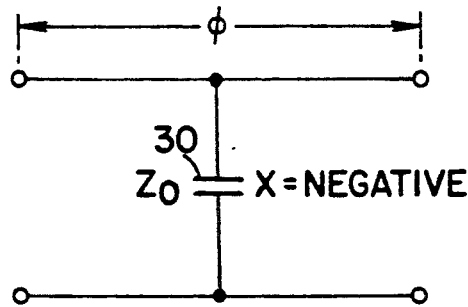
FIG. 4 is a circuit diagram of a network employing both a lumped constant and a length of transmission line.

The term K has the dimensions of a resistance and is the counterpart of the cable characteristic impedance $Z_0$ in the CVCC circuit described above which employs a cable having a length equal to an odd number of quarter wavelengths.

$$\text{Then} \left| \frac{x}{Z_0} \right| = \frac{K}{Z_0} / \left( 1 - \left( \frac{K}{Z_0} \right)^2 \right)$$

where X is the capacitive reactance of capacitor 30 of FIG. 4.

Assuming $\theta = 45°$ and $Z_0 = 75$ ohms.

Tan $(45°) = 1 = -2x/Z_0$ and $X = -Z_0/2 = -75/2 = -37.5$ ohms.

$C = 10^6/2\pi \times 13.56 \times 37.5 = 313$ pf and $K = Z_0 \tan (\theta/2) = 75 \tan (22.5) = 31.1$ ohms and the circuit is fully defined where C is capacitor 30 of FIG. 4. In application to the design of a CVCC converter, $Y_{12} = Y_{21} = j/K$ and $Y_{in} = Z_L/K^2$.

Figure 5:
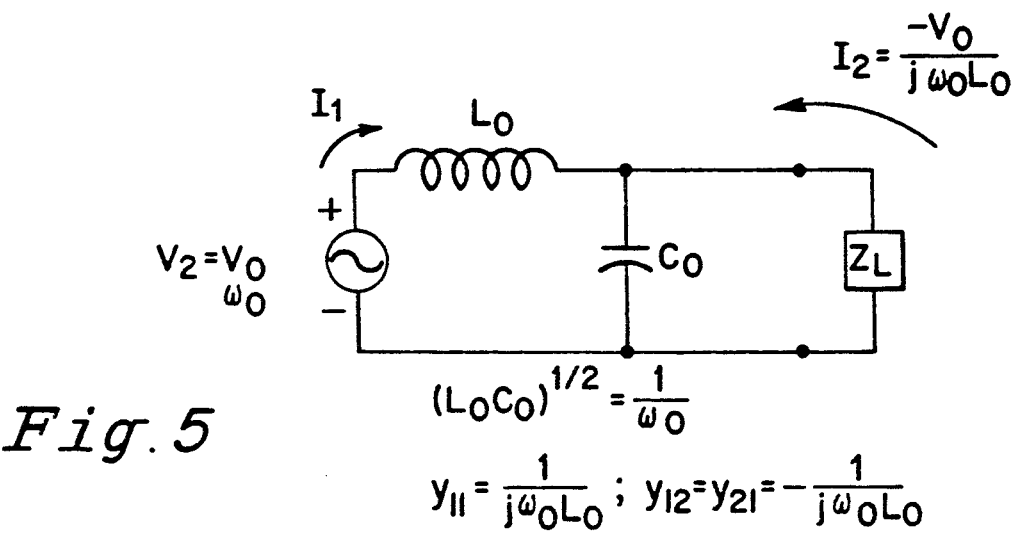
FIG. 5 is a diagram of a first lumped constant network that can function as a constant voltage to constant current (CVCC) circuit.
Figure 6:
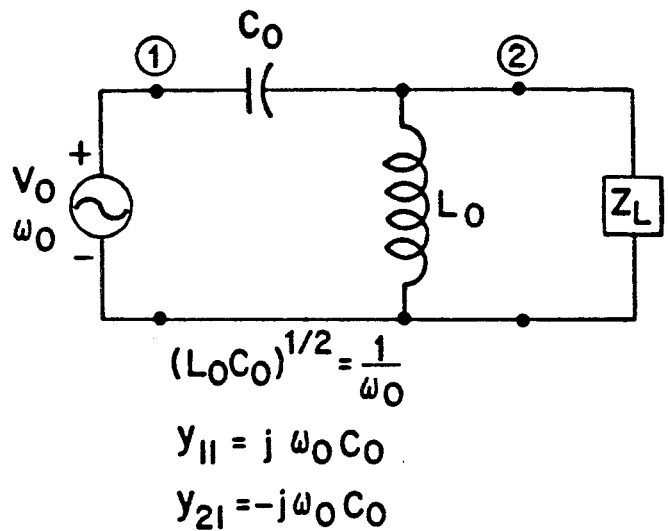
FIG. 6 is a diagram of a second lumped constant network that can function as a CVCC circuit.

FIGS. 5 and 6 illustrate two lumped constant networks which can function as CVCC circuits. The two element network in FIG. 5 consists of a series inductance $L_0$ and a shunt capacitance $C_0$. In order for the network to function as a CVCC device the element values $L_0$, $C_0$ and the radian frequency $W_0 = 2\pi f_0$ must satisfy Equation 6 below:

$$(L_0 C_0)^{\frac{1}{2}} = 1/W_0 \quad (7)$$

where $f_0$ is the operating frequency. The load current $I_2$ in FIG. 5 is given by the equation:

$$i I_2 = jV_0/W_0 L_0 = jW_0 C_0 V_0 \quad (8)$$

For the network in FIG. 6

$$I_2 = -jV_0/W_0 L_0 = -jW_0 C_0 V_0 \quad (9)$$

Thus the output current level can be selected for these two lumped element circuits by the use of Equation 8 and 9. The symbol j in Equations 8 and 9 is the conventional ninety degree phase multiplier. Thus by conforming the system to that illustrated in FIG. 1 with the constraints cited above, a single constant voltage supply may be employed to supply constant current concurrently to multiple loads connected in parallel. Cables of length equal to an odd number of quarter wavelengths can be employed as shown. Other types of networks some of which are described above can also be employed. A present unit is designed to supply eight loads from a single supply without interaction between the loads, the only limitation being the power available from the supply.

It should be noted that the above analysis using impedance instead of admittance is also applicable to constant current to constant voltage converters.

Once given the disclosure, many other features, modifications and improvements will become apparent to the skilled artisan. Such other modifications, features and improvements are, therefore, considered a part of this invention, the scope of which is to be determined by the following claims.

I claim:

1. A power supply for concurrently supplying a plurality of independent loads having impedance each with an independent selectable constant current without interaction between the loads comprising
a constant voltage power supply having an output port connected to
a plurality of two port networks each one of which fulfills the conditions $Y_{22}=0$ and $Y_{21}\neq 0$ where $Y_{22}$ and $Y_{21}$ are the equivalent short circuit admittance parameters of each network considered independently of the remaining networks, a first port of each network being connected to the output port of the power supply in parallel with the remaining networks, a second port of each network being connected to a separate and independent electrical load.

2. A power supply according to claim 1 wherein each network is a uniform transmission line, uniform cable, or uniform waveguide which has an electrical length equal to an odd number of one quarter wavelengths, where the characteristic impedances of each of the quarter wavelength transmission lines are the same.

3. A power supply according to claim 1 wherein the equivalent short circuit parameters of the network are represented by the symbol $Y_{mn}$, n and m being positive integers that refer to the various ports of the overall distribution network and all of $Y_{mn}$ being equal to zero with the exception of those parameters for which both m and n are both greater than 1 where n=1 refers to the port at which the networks are connected in parallel and to which the power supply is also connected.

4. A power supply for concurrently supplying a plurality of independent loads each with an independently selectable constant current load without interaction between the loads comprising
an output circuit having an output connection with a constant voltage developed across said connection a plurality of low loss circuits each having an electrical length of $(2n-1)90°$ where n is any one of various even integers each said low loss circuit having its input connection connected to said output connection of said power supply.

5. A power supply according to claim 4 wherein each said low loss circuit is a two port network, and wherein said low loss circuits have a sufficiently low loss that a short circuit across an output port does not effect the current supplied to the output port of any other of said low loss circuits.

6. A power supply according to claim 1 wherein one or more of each network of the plurality of networks incorporates an ideal transformer.

7. A power supply according to claim 3 wherein $Y_{11}$ is also equal to zero.

8. A power supply according to claim 1 in which each of the two port networks fulfills the condition $Y_{11}=0$ in addition to the conditions $Y_{22}=0$ and $Y_{21}\neq 0$, $Y_{11}$ being a short circuit admittance parameter of one of the networks.

9. A power supply according to claim 1 in which one or more of the plurality of networks consists of a length of low loss transmission line cable or waveguide and a low loss capacitance in parallel at the center of the transmission line, cable or waveguide.

10. A power supply according to claim 1 in which one or more of the plurality of networks consists of a series inductance $L_0$ connected to the power generator output plus a parallel capacitance $C_0$ connected in parallel across the load impedance, for which the condition $\sqrt{L_0C_0}=\frac{1}{2}\pi f_o$ is fulfilled where $f_o$ is the operating frequency of the power supply.

11. A power supply according to claim 1 in which one or more of the plurality of networks consists of a series capacitor $C_0$ connected to the power supply and a parallel inductance $L_0$ connected in parallel with the impedance of the load for which the condition $\sqrt{L_0C_0}=\frac{1}{2}\pi f_0$ is fulfilled where $f_0$ is the operating frequency of the power supply.

12. A power supply according to claim 1 wherein the equivalent short circuit parameters of the networks are represented by the symbol $Y_{mn}$, m and n being positive integers that refer to the various ports of the overall distribution network, all of the $Y_{mn}$ being equal to zero except for the case where $m\neq 1$ and $n=1$ and where $m=1$ and $n\neq 1$.

* * * * *